(No Model.)
G. M. PATTEN.
CASTER.
No. 335,301. Patented Feb. 2, 1886.
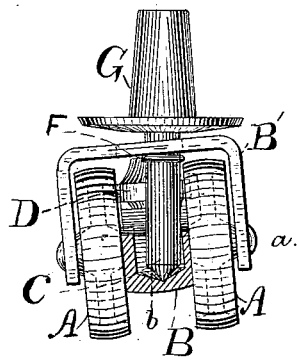
Fig: 1.
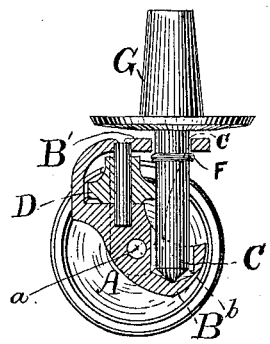
Fig: 2.
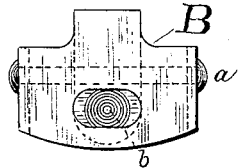
Fig: 3.
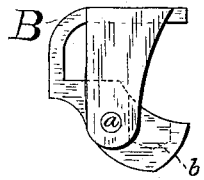
Fig: 4.
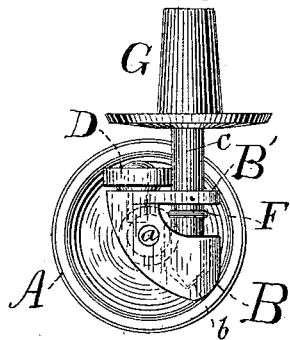
Fig: 6.
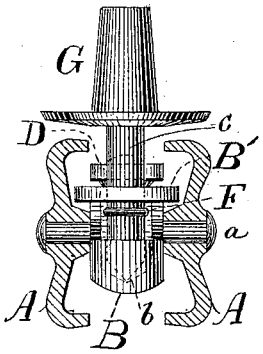
Fig: 7.    Fig: 5.
Witnesses:
Harry Edwards
J. W. Reed.
Inventor:
Geo. M. Patten
By H. D. Donnelly
his Attorney

UNITED STATES PATENT OFFICE.

GEORGE M. PATTEN, OF JERSEY CITY, NEW JERSEY.

CASTER.

SPECIFICATION forming part of Letters Patent No. 335,301, dated February 2, 1886.

Application filed July 21, 1881. Serial No. 38,248. (No model.)

*To all whom it may concern:*

Be it known that I, GEORGE M. PATTEN, of Jersey City, in the county of Hudson and State of New Jersey, have invented a new and useful Improvement in Casters for Furniture and other Uses, of which the following is a specification.

My invention relates to swiveling casters having two floor-wheels; and the objects of my invention are to secure greater freedom in swiveling action and to increase the durability.

In the drawings, Figure 1 is a front view of the improved caster, with a flange and pintle-holder for attachment to furniture, and with an anti-friction wheel, and the frame extended as a housing over and outside the wheels, giving a bearing outside of each for the axles, and showing also a portion of the frame in section to exhibit more clearly the cup bearing or socket of the pivot-shaft. Fig. 2 is a vertical cross-section of the same at a central line of the pintle and pivot at right angles to the axle of the floor-wheels. Fig. 3 is a top view of the frame, showing the position of the downwardly-projecting parts and of the axle of the wheels. Fig. 4 is a side view of the same, with the socket or cup bearing indicated by dotted lines. Fig. 5 is a front view of a caster embodying the same elements, but constructed with the entire frame between the two wheels and within their periphery, the wheels being shown in section through their centers. Fig. 6 is a side view of the same with the wheel nearest the observer removed. Fig. 7 is a top view of the frame of the same with the floor-wheel axle.

Like letters indicate like or similar parts in the different figures.

The two wheels A A are upon a horizontal axle, *a*, that passes across through the frame B. When the frame B extends above and outside the floor-wheels A, as in Figs. 1, 2, 3, 4, the axle *a* passes through such frame; but where the exterior portion of the frame is omitted, as in Figs. 5, 6, 7, the axle is provided with heads to retain the wheels. The frame B is provided with a socket or step, *b*, in front of the axle and between the wheels A, and into this the lower end of the vertical pintle C rests. The socket or step is slightly conical or tapering, to allow the pintle C to assume a slightly-inclined position, as seen in Fig. 1.

The portion B' of the frame B is in the form of a loop or bow having an elongated hole for the pintle C to pass through; and F is a collar around the pintle C, and below the bow B', to prevent the floor-wheels and frame dropping and becoming separated from the pintle C.

The roller D is upon a vertical axis or pin passing into the frame B, and this roller D rests against one side of the pintle C, and the weight that rests upon the caster tends to press the roller against the pintle; hence the pressure of the parts in turning is upon a rolling surface, and the floor-wheels, axle, and frame swivel or turn readily upon said pintle C.

Where the roller D is below the part B' of the frame, as in Figs. 1 and 2, the vertical axis or pin of such roller passes at both ends into the frame; but when the roller D is upon the part B' of the frame, as in Figs. 5 and 6, the axis of the said roller projects above said frame.

The pintle-holder G is usually provided with a flange, and into it the vertical pintle C is firmly secured. This pintle-holder may be of any desired character, and adapted to be attached to furniture or other articles.

This caster is very strong. It turns upon its vertical pintle with very little friction, and the weight being taken upon the end of the pintle and near the level of the axle of the floor-wheels, the caster swivels very easily and the parts are not liable to wear loose, because the roller D rests against the side of the pintle, and the bearing is entirely upon the pintle, instead of being partially against the plate of the pintle-holder, as heretofore made use of.

I claim as my invention—

1. The combination, with the vertical pintle and the two caster-wheels and axles, of a frame between the wheels, into which said vertical pintle passes, and which also receives the axles of the caster-wheels, and a roller upon a vertical axis between the caster-wheels, and bearing against one side of the vertical pintle, substantially as specified.

2. The combination, with the vertical pintle and the two caster-wheels and axles, of a frame between the wheels, into which said vertical pintle passes, and which also receives the axles of the caster-wheels, and a roller upon a vertical axis between the caster-wheels and bearing against one side of the vertical pintle, and a collar around said pintle, to prevent the floor-wheels and frame dropping and separating from the pintle, substantially as specified.

G. M. PATTEN.

Witnesses:
HARRY EDWARDS,
J. M. REED.